United States Patent

Guha

[15] 3,682,485

[45] Aug. 8, 1972

[54] PHONOGRAPH TONE ARM

[72] Inventor: Dwipendra Nath Guha, Benton Harbor, Mich.

[73] Assignee: V-M Corporation, Benton Harbor, Mich.

[22] Filed: Jan. 15, 1971

[21] Appl. No.: 106,768

[52] U.S. Cl. ....................274/23 R
[51] Int. Cl. ....................G11b 3/10
[58] Field of Search ....................274/23 R

[56] References Cited

FOREIGN PATENTS OR APPLICATIONS 952,474 11/1956 Germany ....................274/23 R

*Primary Examiner*—Harry N. Haroian
*Attorney*—Johnson, Dienner, Emrich, Verbeck & Wagner

[57] ABSTRACT

A tone arm is supported by a rolling pivot for vertical movement relative to a horizontal base plate which freely swings on a vertical axis.

16 Claims, 9 Drawing Figures

Inventor:—
Dwipendra Nath Guha:
By Johnson, Dienner, Emrich, Verbeck & Wagner
Attys.

PHONOGRAPH TONE ARM

This invention relates to phonograph tone arms and particularly to a novel and improved pivotal mounting therefor.

A principal object of the invention is to provide means for mounting a tone arm which will accommodate its vertical movement with respect to a horizontally-supported record in a manner to obtain good fidelity in sound reproduction.

In accomplishing said object the invention provides a rolling pivot pin support for the tone arm, a feature of which is that there is essentially no resistance to the pivotal movement of the tone arm to and away from the record.

A further feature of the invention is that the rolling pivot compensates for relative horizontal displacement of the stylus supported end of the tone arm which accompanies vertical pivotal movement of the tone arm.

Where tone arms are mounted to pivot on a fixed horizontal axis as has been common in previously available tone arm mounting structures, the movement of the stylus supporting end of the tone arm toward and away from the record is not truly vertical or at right angles to the record. Rather, it varies from the true vertical by a progressively increasing amount in accordance with the angle through which the tone arm swings on its pivot from a horizontal position. Thus a stylus tracking in the groove of the first record deposited on the turntable is displaced horizontally by an amount such that it is effectively closer to the pivotal axis of the tone arm than is the stylus when tracking in the groove of the top record of a stack several records high on the turntable. This horizontal displacement of the stylus as the tone arm pivots vertically has been found to be a cause of "wow" and is particularly significant where the record being played has any amount of warpage. The resultant noise is referred to in the art as "warp wow" and a feature of this invention is that "warp wow" can be substantially eliminated with resultant improvement in record play fidelity.

As afterwards more particularly described, a tone arm in accordance with this invention is supported on a truly cylindrical shaped roller or pivot pin which is supported on a flat plate by means of compliant metal strips. These compliant strips which are fastened to the cylindrical roller and tightly wrapped thereabout have ends oppositely directed from both sides of the roller which also are fastened to the flat plate. The pin or roller is thus free to roll in a direction paralleling the flat plate to effect pivoting of the tone arm but it cannot slide on its mounting parts. Moreover within limits defined by the mounting positions of the extended ends of the compliant strips fastened to the flat plate there is theoretically no resistance to rotation of the pivot pin or tone arm mounted thereon other than inertia. This is because the bending resistance of one set of compliant strips is compensated by the bending forces of the other set.

Moreover, horizontal displacement of the stylus supporting end of the tone arm becomes a function of the radius $R$ of the roller, the length $L$ of the tone arm and the angle $\Phi$ through which the tone arm rotates between a horizontal position and a position where its stylus engages in the groove of the first record deposited on the turntable. Thus it is a feature of this invention that by proper selection of $L$, $R$ and $\Phi$ horizontal displacement of the stylus due to tone arm vertical movement as caused by a warped record in the stack can be reduced to a minimum.

Also, the minimal resistance which the rolling pivot imparts to the pivoting of the tone arm means that stylus pressure is substantially a constant at different record heights on the turntable. Furthermore, when tracking in the groove of a warped record with resultant up and down movement of the tone arm end, the stylus pressure remains constant and tracking distortion due to stylus pressure variation is eliminated.

At the same time, the means of mounting the tone arm for the vertical component of its necessary movement when tracking in the record groove is simple, economical to construct and entirely practical.

Many other features, as well as objects and advantages of the invention will be at once apparent, or will become so, upon consideration of preferred embodiments of the invention which now will be described in connection with the accompanying drawings.

DESCRIPTION OF DRAWINGS

For a better understanding of this invention, reference may be had to the accompanying drawings, in which.

DETAILED DESCRIPTION

Figure 1:
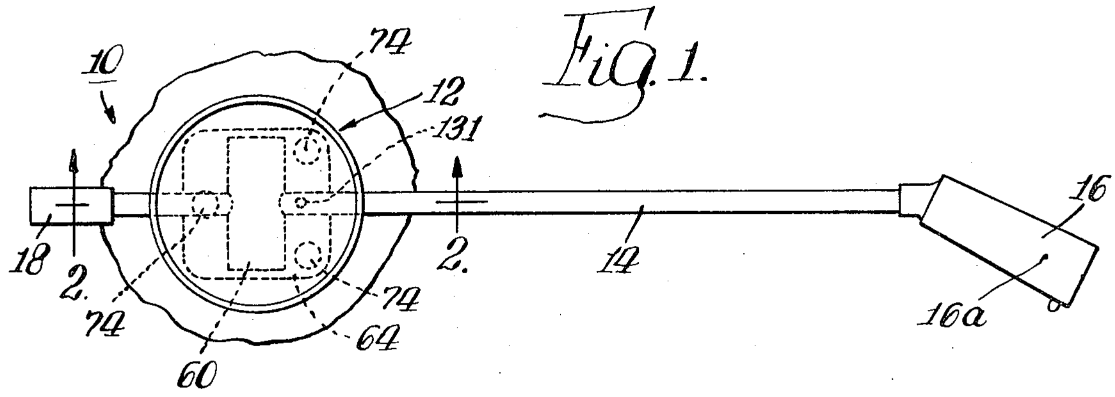
FIG. 1 is a top plan view of a phonograph tone arm assembly constructed in accordance with the present invention.
Figure 2:
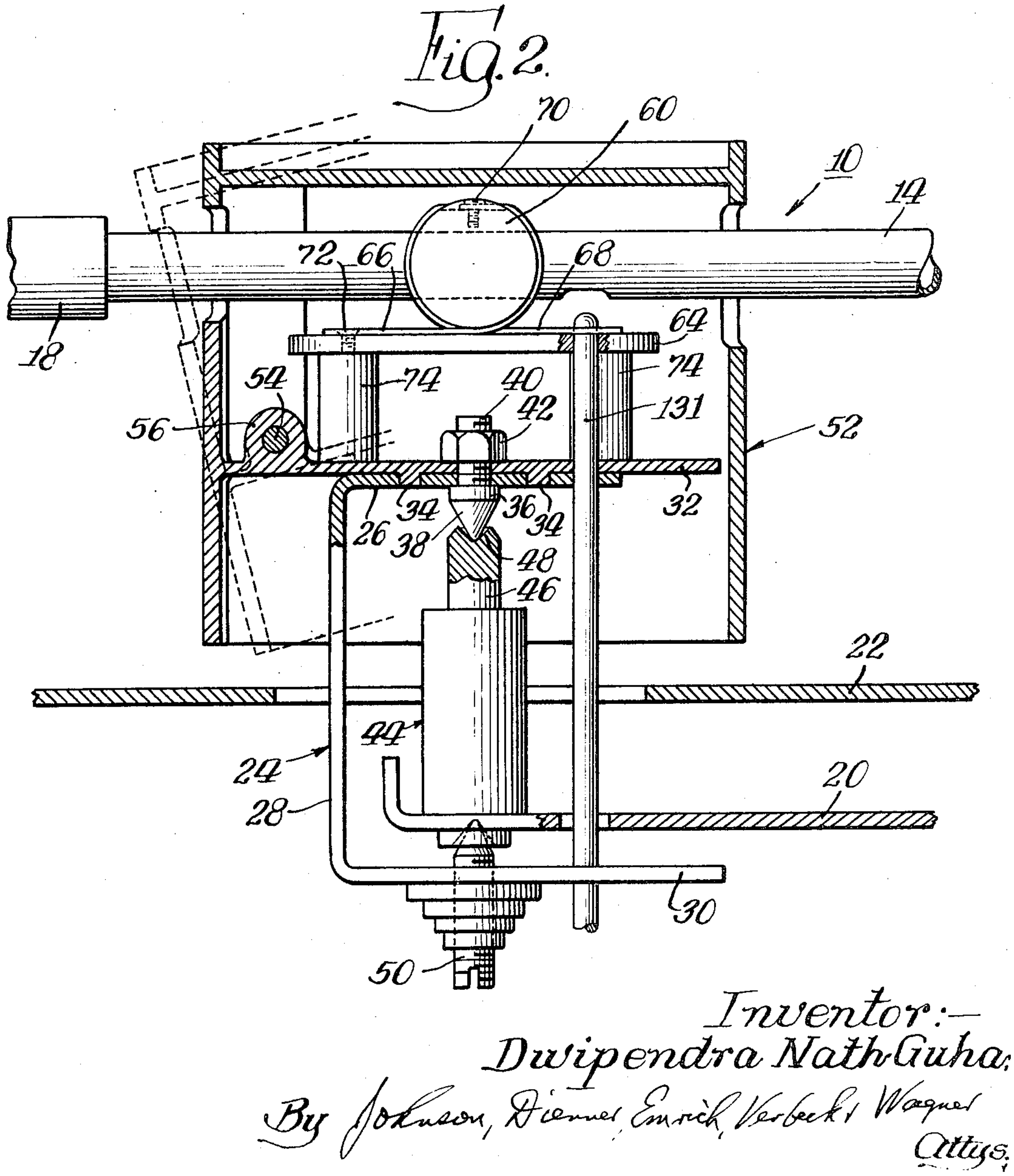
FIG. 2 is an enlarged fragmentary vertical sectional view thereof taken substantially along line 2—2 of FIG. 1.

Referring now to the several drawings wherein like parts are identified by like reference numerals, FIGS. 1 and 2 show the invention embodied in a tone arm assembly 10 comprising a tone arm mount indicated generally at 12 and a tone arm 14 supported by said mount for both horizontal and vertical pivotal movements as afterwards described. A cartridge housing 16 is shown fixedly mounted at the forward end of the tube arm and which carries a stylus **16*a*** for tracking in the groove of a record rotating with the turntable of a record player in which the invention is utilized. A counterweight 18 is shown carried on the rear end of the tone arm 14.

Referring now to FIG. 2, the tone arm assembly 10 is shown mounted on sub-plate 20 of a conventional phonograph record player provided with a rotatable turntable (not shown) onto which one record or more than one record is successively dropped or lowered for individual playing by stylus 16*a* tracking in the groove of the topmost record on the turntable as it is rotated in a well known manner. As is conventional, sub-plate 20 may be spring-mounted or otherwise supported from a record changer base plate 22, whereby the tone arm assembly is disposed above the base plate.

In order that stylus 16*a* can track in the groove of the topmost record with rotation of the turntable, the tone arm assembly 10 must be free to swing about a vertical axis, i.e., it must be free to move through a plane generally parallel to the plane through which the record rotates with the turntable. Although any suitable means may be provided for this purpose, in the illustrated embodiment of FIG. 2 the tone arm mount 12 includes a tone arm bracket or yoke 24 which is generally C-shaped in cross section and comprises an upper horizontal arm 26, a vertical arm 28 and a lower horizontal arm 30. A housing bracket 32 is mounted on the top of the yoke arm 26 and has a pair of locating studs 34 which project down into apertures in the arm 26. A pivot stud 36 has a conical lower end 38 and a threaded upper end 40, the latter projecting upwardly through the yoke arm 26 and housing bracket 32. Nut 42 is applied to the threaded end 40 so as to clamp together the housing bracket 32 and yoke arm 26.

A bearing post 44 is staked at its lower end to the sub-plate 20 and extends upwardly therefrom. Bearing post 44 has a reduced diameter upper end portion 46 provided with a conical recess 48 in the top thereof. The conical lower end 38 of the pivot stud 36 seats in conical recess 48 so that the assembly of yoke 24 and bracket 32 is supported on the upper end of the bearing post 44 for rotation about a vertical axis or one parallel to the axis of the turntable rotation. At 50 is illustrated a second pivot screw which is not made tight against the under side of the post 44, but is merely threaded upwardly far enough to engage the bottom of the post within the provided conical shaped recess and thus takes out the play. In this manner, the assembly of yoke 24 and housing bracket 22 is stabilized while remaining free to rotate on the conical bearing 38 about a vertical axis. Because the assembly is supported vertically, only at the conical bearing 38, frictional resistance to rotation of the tone arm and stylus through a vertical plane is reduced substantially to a minimum.

At 52 is a housing or hinge cover which encloses the tone arm mount and it may be pivotally mounted on the bracket 32 as by hinge pin 54. As illustrated, housing 52 has the configuration of a hollow cylinder and a lug 56 formed on bracket 32 projects between its pair of spaced lugs on the housing 52 through which hinge pin 54 passes to hingedly mount housing 52 on said bracket 32. It should be understood, however, that in normal operation of the tone arm 14, housing 52 does not pivot on pin 54, but remains in the position shown in solid lines of FIG. 2. It is only when it is desired to replace a stylus or otherwise again access inside cartridge housing 16 that the housing 52 is manually pivoted upwardly as partially shown by the dash lines in FIG. 2.

Tone arm 14 must also be free to move vertically with respect to mount 12 to permit raising the stylus off the record at the end of record play and also to lower the stylus into the record groove at the start of play. Vertical movement of the stylus of the tone arm is also necessary in order that the stylus may stay within the groove of a warped record during play. Advantageously, said vertical movement of the stylus should be essentially vertical to avoid "warp wow" during record play. In accordance with this invention a frictionless rolling pivot system provides substantially true vertical motion of the outer end of the tone arm and thereby the stylus.

Figures 3, 4, 5, 6, 7, 8, 9:
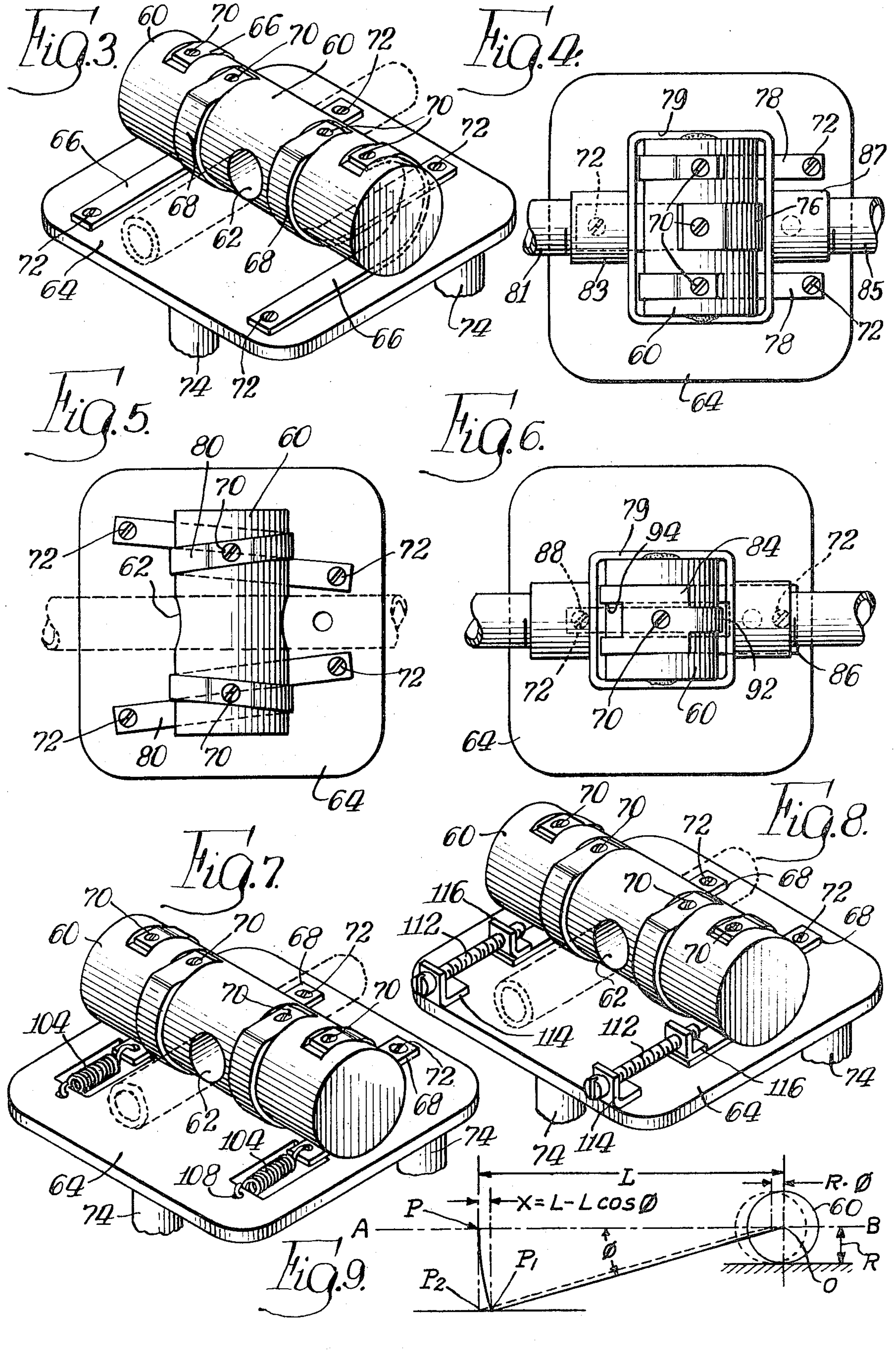
FIG. 3 is a front perspective view of the rolling pivot support for the phonograph tone arm of FIGS. 1 and 2 and which comprises a roller member mounted to a base plate by four compliant metal strips.
FIG. 4 is a top plan view of a modification of the invention wherein the roller member is mounted to the base plate by three compliant strips.
FIG. 5 is a top plan view showing a further embodiment of the invention wherein the roller member is mounted to the base plate using two compliant strips.
FIG. 6 is a top plan view of still another embodiment of the invention and shows the roller member mounted to a base plate using a single compliant strip.
FIGS. 7 and 8 are front perspective views illustrating alternate ways of tensioning the compliant strips.
FIG. 9 is a schematic view on an enlarged scale of a tone arm assembly and illustrates the horizontal displacement of the stylus which occurs with vertical pivoting of the tone arm and how the invention compensates therefor.

FIG. 3 illustrates one such arrangement wherein tone arm 14 is fixed to a roller member 60 by press fitting or otherwise securing it within a bore 62 crosswise through the roller 60 at right angles and intersecting its longitudinal axis. As illustrated, roller member 60 comprises a pivot pin having a cylindrically shaped outer or peripheral surface and is interconnected to the upper flat surface of a base plate 64 by compliant means consisting of four compliant strips or bands. Plate 64 is fixed in spaced relation over bracket 32 as by tripod 74 so that it rotates horizontally with C-shaped yoke 24.

As illustrated by FIG. 3, said compliant strips or bands comprise first and second pairs of straps 66,68. Each strap is fastened at one end to the upper surface of the roller 60 in a suitably provided recess as by screws 70. The compliant bands or straps of one of said pairs 66 are tightly wrapped clockwise about the lower half of roller 60 and have outer ends which extend forwardly therefrom in tangential fashion and are fastened as by screws 72 to the base plate 64. The compliant straps or bands of the second pair 68 are similarly fastened to the upper side of the roller 60 but are tightly wrapped counterclockwise about the lower periphery of the roller 60 and extend tangentially therefrom rearwardly across the upper surface of the base plate 64 and are fastened at their outer ends to said base plate as by screws 72. The compliancy of said strips 66 and 68 allows roller 60 freedom to roll either fore or aft by rolling on one of said pairs or sets of compliant strips as it unrolls from the other set or pair of compliant strips. To assure that the direction of roll will be horizontal or at right angles to the axis on which base plate 64 rotates, the upper surface of plate 64 over which the oppositely extending sets of compliance strips 66 and 68 extend should be flat and also at said angle. At least the portion of the under surface of the roller 60 which is engaged by said compliant strips should be of a truly cylindrical curved shape. Additionally, both pair of compliant strips 66 and 68 must be wrapped tightly about the under surface of the cylindrical peripheral surface of the roller 60 so that the roller or pivot pin 60 rolls and does not slide. Since there is no sliding action between the pin or roller 60 and the base plate 64, the plate provides no frictional resistance to the vertical motion of the tone arm which the roll of the pin 60 enforces. Furthermore, when the compliant strips 66 and 68 are constructed of the same material and have similar dimensions the bending forces of one set of strips is counterbalanced by the resistance to unbending by the other set of strips in either direction that the roller or pivot pin 60 rolls freely to effect pivoting of the tone arm 14 subject only to inertia. The compliant strips 66 and 68 can be formed from a large number of materials, either metal or plastic. One satisfactory material has been found to be 0.002 inch thick beryllium copper.

In FIGS. 4, 5 and 6 three alternate arrangements of compliant strip means for mounting the cylindrical pin 60 on the base plate 64 are illustrated. In FIG. 4 a three-band arrangement is illustrated which utilizes a middle flexible compliant strap 76 and a pair of flexible compliant end straps 78 spaced on either side thereof. One end of each said straps is secured to the peripheral surface of the cylindrical pin 60 as in the first described embodiment. The other or opposite end of the middle strip 76 extends tangentially in a direction forwardly from the cylindrical pin 60 along the flat surface of the base plate 64 and the other or opposite end of the pair of straps 78 extend tangentially in a rearward direction or opposite to that of the middle compliant strip 76. The material and dimensions of said strip as in the first described embodiment are selected to provide equal but opposing bending forces on pin 60 as it rolls either fore or aft to effect vertical pivoting of the tone arm. Although the tone arm could be passed through a similarly provided bore in the pin 60, as in the embodiment of FIG. 3, in this embodiment illustrated by FIG. 4, the tone arm is mounted on the rolling pin 60 using a rectangular collar 79. Said collar 79 is fitted lengthwise over the pin and is secured to opposite ends of the roller pin 60. The tone arm is divided into two parts. The forward part 81 of the tone arm has one end threaded or otherwise secured to a forward bushing 83 in said collar and the rearward part 85 of the tone arm has one end secured to a rear bushing 87 of said rectangular collar 79. Any other suitable mounting means for fixing the tone arm to the roller pivot pin 60 may be employed. Under some circumstances it may suffice to secure an intermediate portion of the unitary tone arm 14 on the upper surface of the roller pin 60 as in a provided recess (not shown). As afterwards explained, the tone arm must be free to pivot vertically in response to rolling of the pivot pin 60 and the rolling action of the pin must be unrestricted by the compliant strips within the limits necessary to useful operation of the tone arm stylus as it tracks the groove of the one or topmost one of the record stack on the turntable. Advantageously, it also should be possible to raise the stylus supporting end of the tone arm high enough off the topmost record to permit moving the tone arm to one side as in effecting a record change operation or removal of the records. This is obtained by operation of lift rod 131 (FIG. 2) as is well known. In the present invention the locations of the fastening screws 70 and 72 determine the limits through which pins 60 may roll and therefore the angle through which the tone arm and its stylus may swing.

FIG. 5 shows an arrangement employing a pair of compliant straps 80 wrapped tightly about the peripheral surface of the cylindrical pin 60 in a transverse direction to its longitudinal axis so that it completely encircles the pin 60. The intermediate portion of said straps is fastened to the upper surface of the cylindrical pin as by screws 70. The opposite ends of both straps extend fore and aft in tangential directions from the cylindrical pin and are fastened to the base plate 64 as by screws 72. In this embodiment the tone arm is illustrated as mounted within a bore through the pin 60.

FIG. 6 illustrates still another arrangement in which a single resilient compliant strap 84 is employed. In this form of the invention strap 84 is also completely wrapped about the peripheral surface of cylindrical pin 60 and has its opposite ends 86 and 88 extending tangentially in fore and aft directions from the cylindrical pin 62 and is fastened to the base plate 64 as by screws 72. The mid portion of the single strap is fastened to the upper surface of cylindrical pin 60 as by screw 70. In order to facilitate the necessary wrapping of the strap 84 completely about the periphery of roller 60, one end portion of the strap is formed as an elongated narrow strip 92 and its other end portion includes a rectangular cut-out 94 appropriately located and dimensioned such that the end formed as elongated narrow strip 92 may extend therethrough.

As thus far described, the compliant strips are stretched or wrapped tightly about the cylindrical peripheral surface of the roller by accurately sizing the strips in relation to their points of attachment to roller 60 and base plate 64. However, slack adjusting means may also be employed to assure that the compliant strips are tightly wrapped about the cylindrical periphery of the pivot pin. Two such means are illustrated in FIGS. 7 and 8. In both these embodiments, one end of the compliant strip is fastened to the roller 60 as by the aforementioned screws 70. However, in FIG. 7 a tensioning device in the form of a tension spring 104 is hooked between the outer or free end of the compliant strap and an opening 108 in the base plate 64. The tension of the spring serves to keep the compliant strip wrapped tightly around the peripheral surface of the cylindrical pin 60. FIG. 8 illustrates an arrangement wherein the tensioning spring is replaced by a screw 112 which is threadedly mounted between a bracket 114 and an L-shaped bracket 160 connected to the outer or free end of the flexible compliant strip.

As previously mentioned, an important advantage or feature of this invention is that the vertical pivotal movement of the tone arm and its stylus operates essentially free of resistance by its supporting structure. Pin 60 on which the tone arm is fixed does not slide relative to the parts by which it is mounted for rotation and the forces exerted by the opposing compliant strips to the roll of pin 60 counterbalance each other. In addition, because the pivot on which the tone arm swings with the rolling of pin 60 moves horizontally. The invention therefore also compensates for or avoids the effect of horizontal displacement of the stylus which accompanies vertical pivotal movement of the tone arm. In the conventional record player the tone arm swings about a fixed pivot and wherefore the effective length of the tone arm varies between the top and bottom record of the stack. However, in the present invention, as the tone arm 12 moves downwardly through an angle to reach the record playing position, be it the top record on the stack or the first record on the turntable, the cylindrical pin also rolls forwardly by an amount which can be predetermined so that the pivotal axis on which the tone arm is swinging is also horizontally displaced a compensating amount.

This is illustrated by FIG. 9 wherein A–B is considered to represent the axis of the tone arm 14 when supported in a horizontal plane. P is the stylus, *O* is the axis about which the tone arm swings in moving through angle $\Phi$ with rolling of the pivot roller 60. If pivot point $O$ is fixed as in conventional tone arm pivotal mounting structures, then the point of the stylus represented by P follows an arc with rotation of the tone arm through angle $\Phi$ to point P′ causing a horizontal displacement of the stylus indicated in FIG. 9 by $X$. If $L$ represents the distance separating stylus point P from the axis $O$ on which the stylus swings, then this horizontal displacement of the stylus can be represented by the following equation:

$$X = L - L\cos\Phi \quad (1)$$

However, in accordance with the present invention, as P moves through angle $\Phi$, the axis $O$ which also corresponds to the center or rotation of the roller moves forwardly by an amount $R \cdot \Phi$ considering $R$ to be the radius of the roller 60 and $\Phi$ the distance of the arc in radians through which the tone arm axis moves in swinging through angle $\Phi$. Since stylus 16*a* represented at P will have moved forwardly by the same amount the horizontal displacement from P to $P_2$ is now given by $$X = L - L\cos\Phi - R\Phi \quad (2)$$

By differentiating Equation (2)

$$dx/d\phi = L\sin\Phi - R$$

for maximum or minimum value of $x$, then $$L\sin\Phi - R = O \quad (3)$$

or $$\text{Sin}\Phi = R/L$$

$d2x/d\phi = L\cos\Phi$ which is positive for $\Phi = O$ to $\Phi = 90°$ ; hence $X$ is minimum and $dx/d\phi = O$ when $\text{Sin}\Phi = R/L$.

It will be appreciated that by choosing the proper dimensions for $L$, $R$ and $\Phi$ it is possible to reduce the variation in $X$ ($dx$) for change in $\Phi$ ($d\phi$) almost to zero, and the horizontal displacement of the stylus due to vertical motion caused by warping of the record is reduced to an absolute minimum. The invention thus assures that the stylus always moves perpendicular to the record surface as the tone arm rotates vertically and "warp wow" is substantially eliminated. By utilizing the formulas above indicated, the proper dimension of $R$ for roller 60 may be determined in accordance with the length $L$ of the stylus, the position of the stylus below $L$ when the tone arm is in its normal horizontal position with the tone arm spaced off the top record of the stack, the position of the stylus when in the groove of the top record of the stack, and the position of the stylus when in the groove of the first record on the turntable.

Because the effective length of the tone arm (which is illustrated in the center position) depends on the location of the tone arm relative to the axis of the cylindrical roller or pin 60, the relative height of the tone arm also can be modified to lie either above or below the center axis of the pin, depending on the design parameters of the record changer.

It will be apparent that all of the recited objects, advantages and features of the invention have been demonstrated as obtainable in a highly practical and efficient manner.

Having described my invention, I claim:

1. In a phonograph tone arm assembly, the combination of a tone arm and mounting means therefor including a cylindrical roller to which the tone arm is fixed, a supporting surface, and compliant strip means wrapped about said cylindrical roller and fastened thereto, said compliant strip means having ends extending outwardly fore and aft from said roller and fastened to the supporting surface, said compliant strip means accommodating rolling movement of the roller and pivoting of the tone arm therewith.

2. The combination of claim 1 wherein the said fore and aft extending ends of the compliant strip effect equal and opposing forces of resistance to said roll of the roller.

3. The combination of claim 1 wherein the length of the tone arm, the radius of the roller and the angle through which the tone arm swings with roll of the roller are so related that a stylus supported on the free end of the tone arm moves substantially vertically through said angle.

4. In a phonograph tone arm assembly, the combination of a first member which is free to turn on a vertical axis, said first member having a flat upper surface, a second cylindrical member mounted on said flat surface to roll freely relative thereto without sliding, and a tone arm carried by said second member, the tone arm pivoting vertically with roll of said second member and horizontally with turning of the first member.

5. A mount providing a horizontal pivot for a phonograph tone arm comprising a base plate, a roller member, means fastening the roller to said base plate to roll relative to said base, and means mounting the tone arm on said roller member, said roller fastening means guiding the rolling motion of said roller member in a straight path to cause the tone arm to move along a vertical plane.

6. A mount as defined in claim 5, wherein said fastening means guiding the rolling motion of said roller member comprises at least two compliant strips having their opposite ends fastened between said roller member and said base plate and extending from the peripheral surface thereof in opposite tangential directions.

7. A mount as defined in claim 6 wherein the roller has a cylindrical surface and the mount includes means which hold said compliant strips under constant tension to cause said strips to be disposed in tight engagement with said cylindrical surface of said roller member.

8. In a phonograph tone arm assembly the combination of a base plate, a cylindrical pin having a bore formed crosswise along its length, a tone arm mounted in said bore with its stylus supporting end extending forwardly thereof, at least two compliant strips disposed tightly around at least a portion of said cylindrical pin, said strips having one end fastened to said cylindrical pin and the other ends of said strips extending in opposite tangential directions from said pin and fastened to said base plate such that the pin rolls relative to the base plate with pivoting of the tone arm.

9. The combination defined in claim 8 further comprising means which hold said compliant strips under constant tension.

10. The combination defined in claim 9 wherein said tension means comprises resilient means interconnected between said other ends of said compliant strips and said base plate.

11. The combination defined in claim 9, wherein said tension means comprises an adjustable means interconnecting said other ends of the compliant strips and said base plate for selectively varying its length to place said compliant strips under tension.

12. A phonograph tone arm mount providing a horizontal pivot for a phonograph tone arm comprising a base plate, an elongated roller member having a convex curved surface, means mounting the tone arm on said roller member above said curved surface with a free end forwardly thereof, and compliant strip means disposed tightly about said convex curved surface of the roller member in a transverse direction to its length and having at least two ends extending in tangential opposite directions from said convex curved surface and fastened to said base plate, said compliant strip means being fastened to the roller member whereby said roller member rolls in a horizontal path relative to said base plate and the free end of the tone arm moves vertically therewith.

13. A phonograph tone arm pivotal mount as defined in claim 12, wherein said compliant strip means comprises three compliant straps having one end fastened to said roller member and the other end fastened to said base plate such that each of said straps are in tight engagement with at least a portion of said convex curved surface and the middle of said three straps extends in an opposite tangential direction from said curved surface relative to the other two of said straps.

14. A phonograph tone arm pivotal mount as defined in claim 12, wherein said compliant strip means comprises four compliant straps having one end fastened to said roller member and the other end fastened to said base plate such that each of said straps are in tight engagement with at least a portion of said convex curved surface and two of said straps extend in opposite tangential directions from said curved surface relative to the other two of said four straps.

15. A tone arm pivotal mount as defined in claim 12, wherein said compliant strip means comprises two compliant straps positioned at opposite ends along said roller member and wrapped in a tight engagement completely about said elongated roller member, the opposite ends of each of said two compliant straps extending in opposite tangential directions from said convex curved surface and fastened to said base plate.

16. A tone arm pivotal mount as defined in claim 12, wherein said compliant strip means comprises a single strap wrapped in tight engagement completely around said elongated roller member transversely to its length at an approximate mid-point with its opposite ends extending in opposite tangential directions from said convex curved surface and fastened to said base plate.

* * * * *